US005804931A

United States Patent [19]

[11] Patent Number: 5,804,931

Schack

[45] Date of Patent: Sep. 8, 1998

[54] WALL PARTITION SYSTEM AND A DEVICE AND METOD FOR THE OPERATION OF A WALL PARTITION SYSTEM

[75] Inventor: Arnold Schack, Ennepetal, Germany

[73] Assignee: Dorma GmbH + Co. KG, Ennepetal, Germany

[21] Appl. No.: 614,858

[22] Filed: Mar. 13, 1996

Related U.S. Application Data

[63] Continuation-in-part of PCT/DE95/00717 Jun. 1, 1995.

[30] Foreign Application Priority Data

Jul. 14, 1994 [DE] Germany .......................... 44 24 660.9

[51] Int. Cl.[6] .......................... H02K 7/14

[52] U.S. Cl. .......................... 318/4; 318/568.1; 318/569; 16/87 R; 198/93

[58] Field of Search .......................... 16/87 R; 198/93; 318/4, 568.1, 569, 560; 269/47; 49/139

[56] References Cited

U.S. PATENT DOCUMENTS

| | | | |
|---|---|---|---|
| 4,621,552 | 11/1986 | Lopez | 269/47 X |
| 4,683,789 | 8/1987 | Lopez | 269/47 X |

FOREIGN PATENT DOCUMENTS

| | | |
|---|---|---|
| 0471230 | 2/1992 | European Pat. Off. . |
| 0574851 | 12/1993 | European Pat. Off. . |
| 6603588 | 8/1967 | Germany . |

*Primary Examiner*—Karen Masih
*Attorney, Agent, or Firm*—Nils H. Ljungman and Associates

[57] ABSTRACT

A wall partition system and a device and method to automatically move partition panels, the position of which can be changed by a drive motor. Because the device for the automatic movement of the partition runs on a separate pair of rails, such a device can be retrofitted on existing systems.

15 Claims, 8 Drawing Sheets

WALL PARTITION SYSTEM AND A DEVICE AND METOD FOR THE OPERATION OF A WALL PARTITION SYSTEM

BACKGROUND OF THE INVENTION

1. Field of the Invention

This invention relates to a wall partition system with automatic control of wall panels and a device and a method for the operation of an automatic wall partition system in which the individual elements are moved horizontally by an electric motor drive. This horizontal movement is necessary if the entire wall is to be moved into a "parked" position in which it must be pivoted by 90 degrees. As a result of this capability, for example, the display window facade of a store or of a restaurant can be exposed, but it is also conceivable that the displacement of such a wall can divide an indoor room into smaller sections, or combine several smaller rooms into one large room.

2. Background Information

European Patent Application 0 471 230 discloses a room partition which comprises movable wall elements, which includes drivers which are located on an endless belt and which, when necessary, can displace the corresponding wall elements when they are driven by an electric motor. For this purpose, trucks are located in guide rails, from which trucks the individual wall elements are suspended.

European Patent Application 0 574 851 discloses another room partition system which comprises movable wall elements which can be moved by means of support mechanisms which are located on a second rail. In this system, the individual elements are not pivoted by 90 degrees, but are stacked behind one another, which reduces the width of the passage between the rooms after the individual elements have been moved.

German Utility Model 66 03 588 describes a movable wall system in which the individual wall elements are pivoted by 90 degrees. The system described in this utility model is displaced by traction means which can only be moved in synchronization, and in addition to the guide which is located in the vicinity of the ceiling, there is also a guide in the vicinity of the floor. The presence of dirt and foreign objects, however, can rapidly interfere with the operation of such a movable partition system or cause it to jam.

OBJECT OF THE INVENTION

The object of the invention is to improve significantly upon similar devices of the prior art, so that a motorized component can also be retrofitted on an existing system of movable partitions, to make it possible to move the individual elements by motor power. When the automatic operating system is retrofitted onto an existing system which was previously moved manually, it is not necessary to replace the existing system.

SUMMARY OF THE INVENTION

The invention teaches that this object can be accomplished if an additional rail system is attached in the vicinity of the ceiling in front of an existing guide rail in which the individual elements can be moved. A switchable coupling device preferably runs in this additional rail system and is preferably equipped with an identification system to locate the individual elements which in turn contain corresponding indicators, and to move them into a parked position in which they are pivoted by 90 degrees. The entire device is driven by an electric motor which drives an endless belt by means of a pulley. In connection with a programmable controller, the identification system is preferably operated so that it learns to recognize the individual elements in a learning cycle, and moves them into the desired parked position or into the closed position of the partitions. It is also possible to realize only a partial opening of the system, e.g. so that it is not necessary to open up the entire facade in cold weather. The switchable coupling device can consist of an electromagnet, to the armature of which a slide is attached which has a fork-shaped projecting area, so that it detects the connecting pin between the truck and the element located underneath it, and thus the entire element travels inside the guide rails as specified by the program selected.

The coupling device and the identification system can be fed the corresponding signals and the required voltage either by means of sliding-action contacts, or wipers, or by means of a trailing cable. The identification system can thereby be a sensor, e.g. a proximity switch, or optical systems, magnets with corresponding reed contacts, or even switches can be used. When the device is realized in this manner, the width of the panels can be realized in a variable manner, and it is unnecessary to replace the existing system, which is precisely what must be done when fixed-programmed controllers, or fixed-program, read only controllers, are retrofitted onto existing systems.

The operation can be controlled by a programmable controller into which the individual steps of the process can be programmed, so that the control system can be used to open the system partially and to automatically recognize and detect the connected system. Such a device requires no floor guide as is necessary in similar systems.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained below in greater detail with reference to embodiments illustrated schematically in the accompanying figures, in which.

DESCRIPTION OF THE PREFERRED EMBODIMENT

Figure 1:
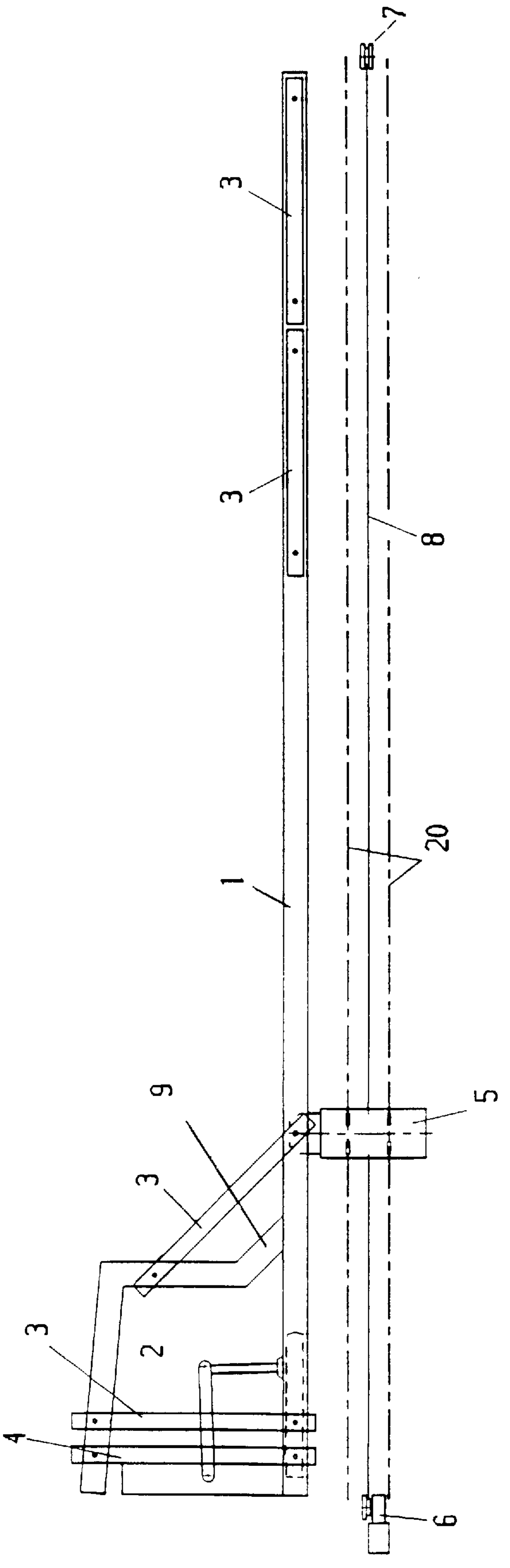
FIG. 1 shows an automatic partition system in a schematic overhead view.
Figure 2:
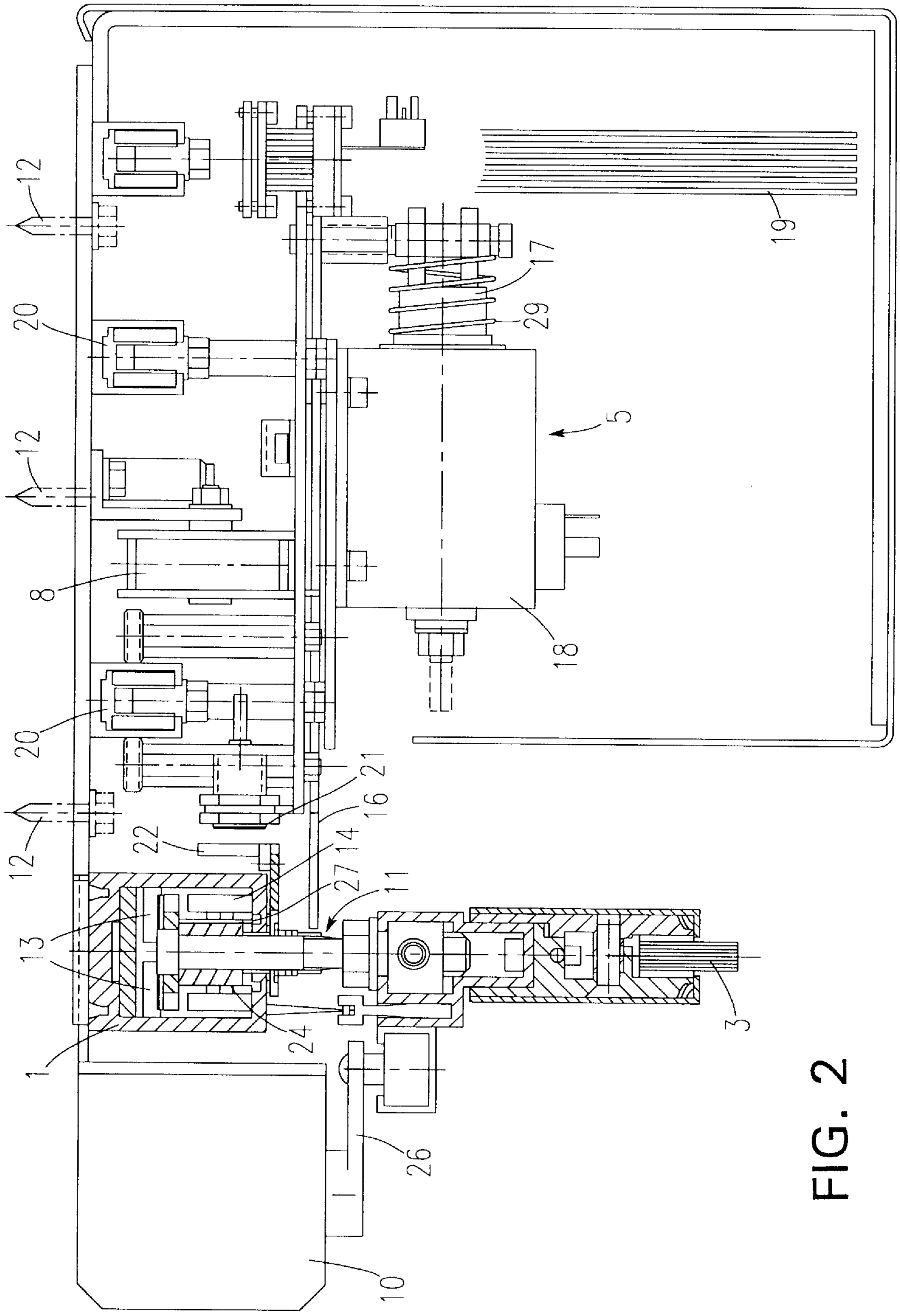
FIG. 2 shows a sectional view, from the side, of the coupling device with the corresponding slide or roller rails and the wall elements.

FIG. 1 is a schematic illustration showing how, on a guide rail 1 which extends in a straight line, with a parked position 2 pivoted by 90 degrees in the left part of the figure, the elements 3 which are otherwise extended along the facade can be displaced. The guide rail 1 need not be in a straight form as in this embodiment. It is also possible for this guide rail 1 to be curved or bent. The curved elements 3 can be made of various types of materials, in particular glass, e.g. in front entrances, or can be made of a non-transparent material if the task at hand is to divide a large space into smaller segments inside a building. In the illustrated embodiment, a rotating panel 4 has been used, which is moved from the closed position into the open position by means of a corresponding drive device of a rotating panel drive 10 (see FIG. 2). This rotating panel 4 preferably is not guided in the guide rail 1, i.e. its movement is independent, and if desired, it can also be controlled by a sensor, if, for example, the rest of the facade, which consists of a plurality of individual elements 3, is to remain closed. To bring the individual elements 3 into the parked position 2 in which they are pivoted by 90 degrees, there should be a switch 9 on the guide rail 1. In front of the guide rail 1, additional slide or roller rails 20 can be placed which, like the guide rail 1, are positively and non-positively anchored in the vicinity of the ceiling. On the slide rails 20, a coupling device 5 is moved, which is driven by a drive belt 8 in connection with a pulley 7 by a drive motor 6.

By means of a control system (not shown in FIG. 1) which can be automatically programmed, or self-programmed, the coupling device 5 can be controlled so that it detects the individual elements 3 and moves them into the parked position 2. The individual elements 3 are each equipped with two trucks 24 (see FIG. 2), so that the individual elements 3 can move inside the guide rail 1. Support rollers 14 (also shown in FIG. 2) thereby support the weight of the element 3, and in the upper position of the truck 24 there are guide rollers 13 which can essentially guarantee a smooth travel in the guide rail 1. Connected with the truck 24 is a connecting shaft 11 which creates the connection with the element 3 suspended below the truck 24. This connecting shaft 11 is preferably made from a round bar. To guarantee a secure movement of the trucks 24 in the vicinity of the switch lever 9, those of the trucks 24 which are the first to approach the switch 9 are different, in terms of their dimensions, from the subsequent trucks. This measure is necessary because at this point, the first truck 24 is threaded or introduced in a forced manner inside the area of the switch 9. The subsequent truck 24 must thereby be prevented from entering the switch 9, which can be achieved, for example, by means of a guide rail 27 which is attached inside the guide rail 1.

Figure 3:
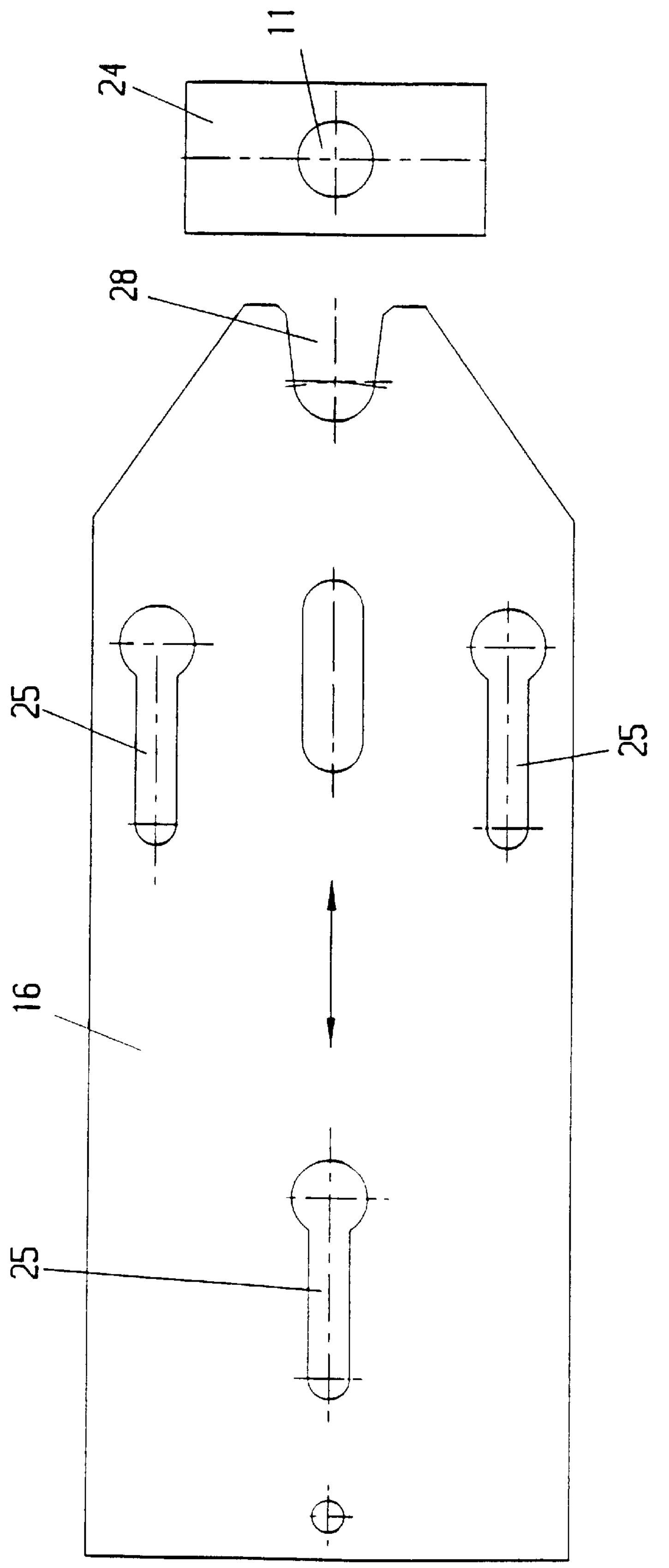
FIG. 3 shows a slide of the coupling device in an overhead view.

Furthermore, on each second truck 24, with reference to the direction of travel into the switch 9, there is an indicator 22 which makes it possible to conduct an identification of the element 3 and thus its location. The indicator 22 can be a microswitch, a magnet which interacts with a reed contact, a proximity switch or any other sensor means capable of correctly defining individual elements 3 and thus their location. Next to the guide rail 1, as described above, there preferably are two slide rails 20 for the coupling device 5, which make it possible to have the coupling device 5 travel past the guide rail 1 at a defined distance in front of it. The coupling device 5 is driven by the drive belts 8. The coupling device 5 can be embodied by an electromagnet, whereby a slide 16 is connected with the armature 17 of the electromagnet 18. The slide 16 can thereby be realized so that it is made of a flat material, for example, in which there are slots 25 (see FIG. 3), so that the slide 16 can be displaced in the horizontal direction. On one end, the slide 16 has a fork-shaped recess 28 which can be brought into engagement with the connecting shaft 11 by actuating the electromagnets 18.

Attached to the coupling device 5 is an identification system 21 which interacts with the indicators 22 which are located on the individual elements 3. When, for example, the identification system 21 encounters an element 3 with its indicator 22, and the respective element is to be displaced, the coupling device 5 remains in this position, and by means of a program command extends the slide 16, which creates a connection with the element 3 by means of an engagement of the fork-shaped recess 28 with the connecting shaft 11. The electromagnet 18 thereby remains turned on until the controller sends the message that the coupling device 5 has moved the element 3 into the parked position 2. When the electromagnet 18 is de-energized, a compression spring 29 essentially guarantees that the slide 16 is disengaged from the connecting shaft 11.

The entire device for the automatic movement of the elements 3 described above can also be fastened in the vicinity of the ceiling by means of the fastening devices 12. As a result of this measure it is possible to install the entire unit on existing systems, and in effect to retrofit these systems which were formerly operated manually, thereby making automatic operation possible.

The coupling device 5 and the identification system 21 are preferably fed the corresponding control data and power by means of a trailing cable 19. Here again, however, a system of rails with corresponding sliding-action contacts, or wipers, can also be used. As a result of the action of the control system used, which can be a stored program controller, for example, the coupling device 5 first performs a learning cycle, to learn:

a) how long the system is; and b) how many elements 3 are in such a system.

When the system is operated automatically, each individual panel can be moved into the parked position 2. Each individual panel can also be moved automatically out of the parked position 2 if the entire system is to be moved into the closed position. With this invention, it is also possible to open the elements 3 part way. A partial opening can be accomplished on one hand by means of the rotary panel drive 10 in connection with the actuator arm 26, and also by means of the controller. In the latter case, one or more elements 3, as desired, can be moved laterally, and the other elements 3 can remain in their closed position.

Figure 1A:
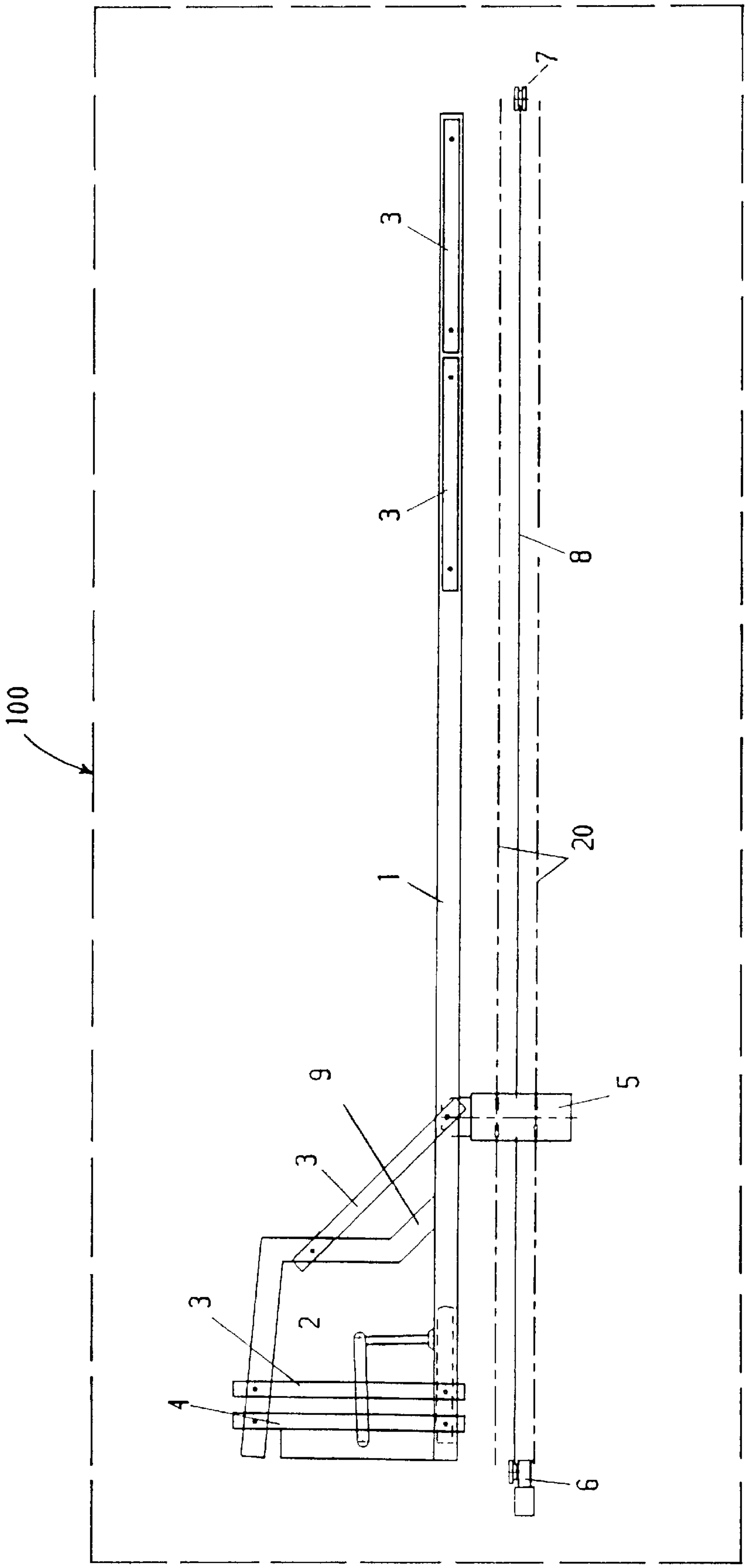
FIG. 1A shows the same view as FIG. 1, but shows additional components.
Figure 1B:
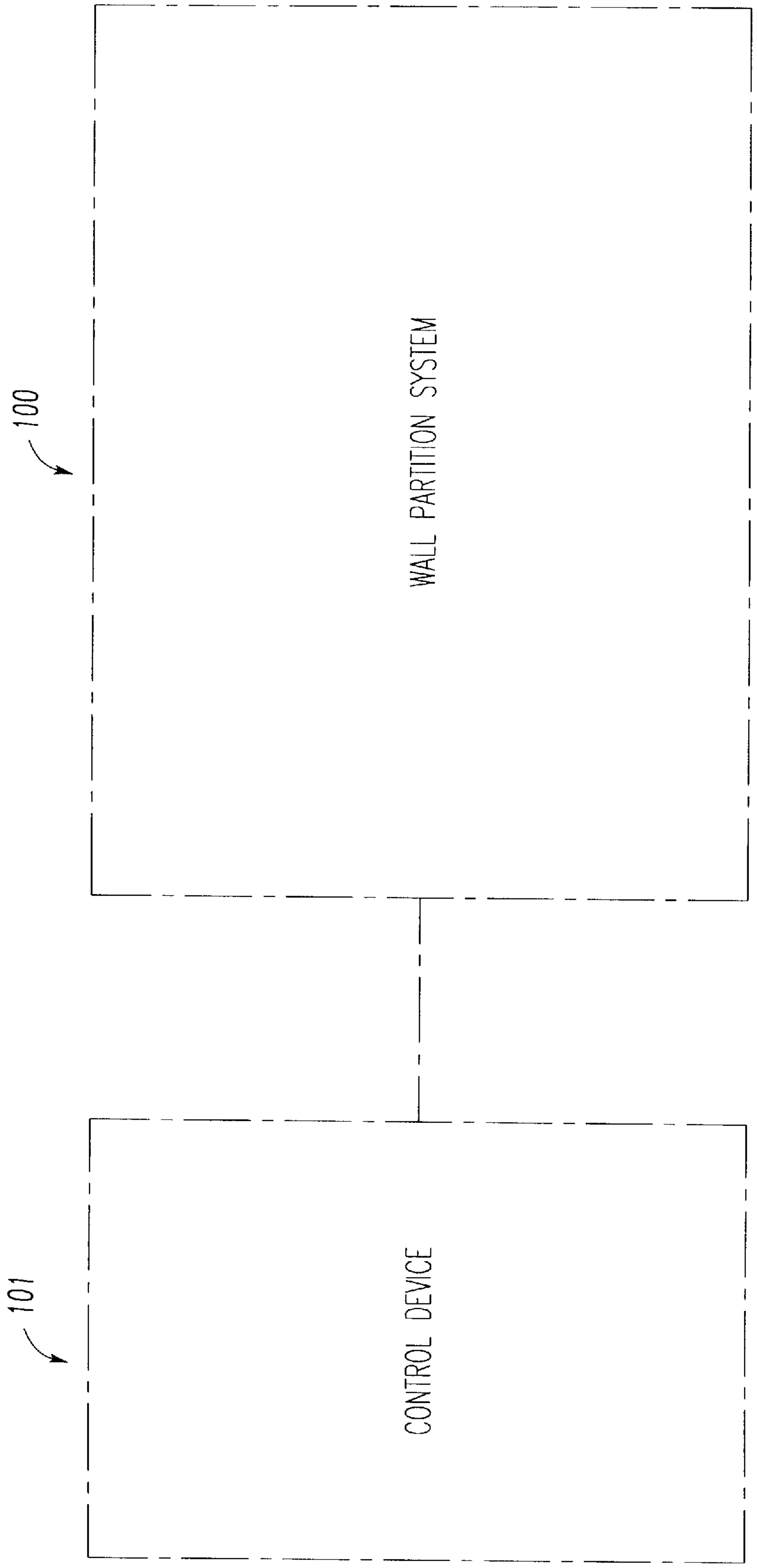
FIG. 1B illustrates the relationship between the control system and the automatic partition system.
Figure 4:
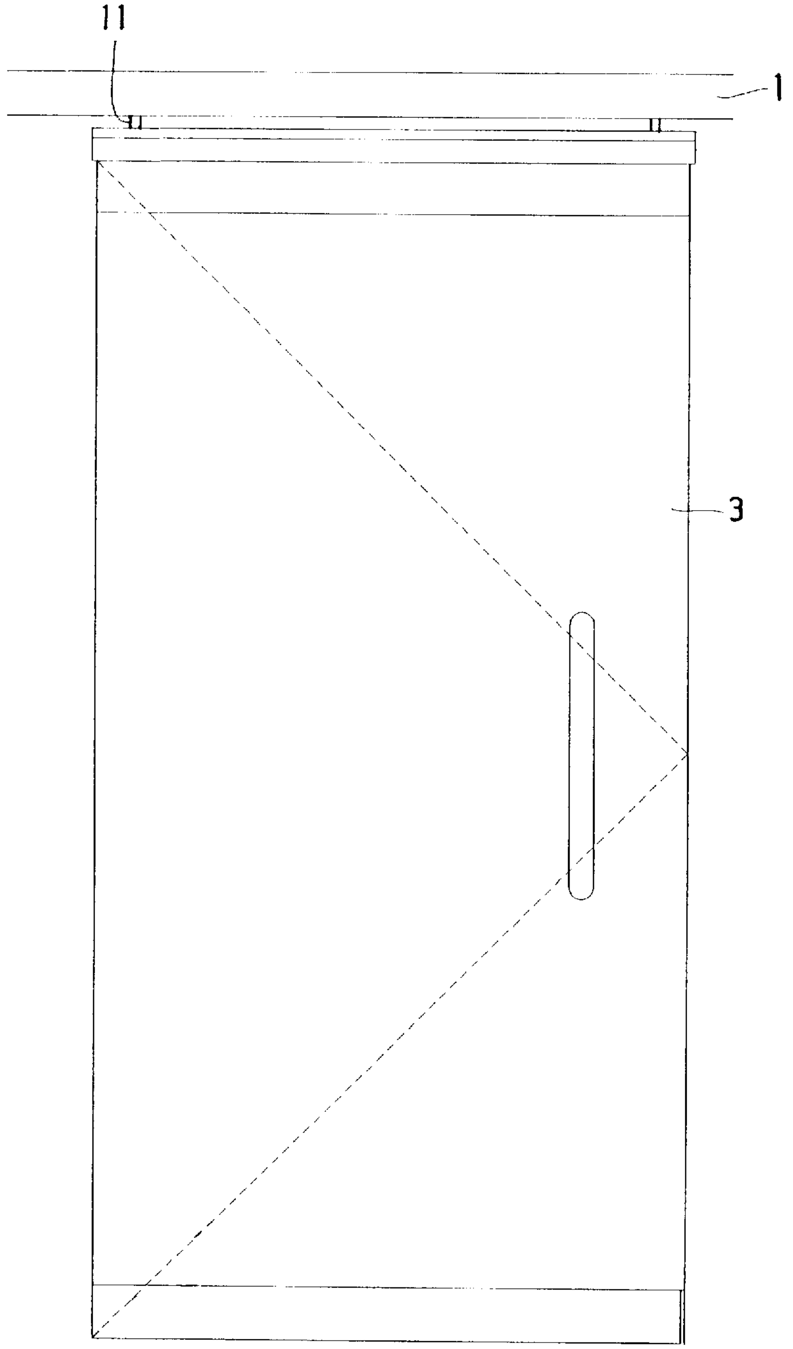
FIG. 4 shows one possible embodiment of a movable wall element.

FIGS. 1A and 1B are schematic representations of one embodiment of the present invention. FIG. 1B illustrates the automatic wall partition system 100 and the control device 101 as being operatively connected to one another. FIG. 4 shows one possible embodiment of a wall element 3.

Figure 5:
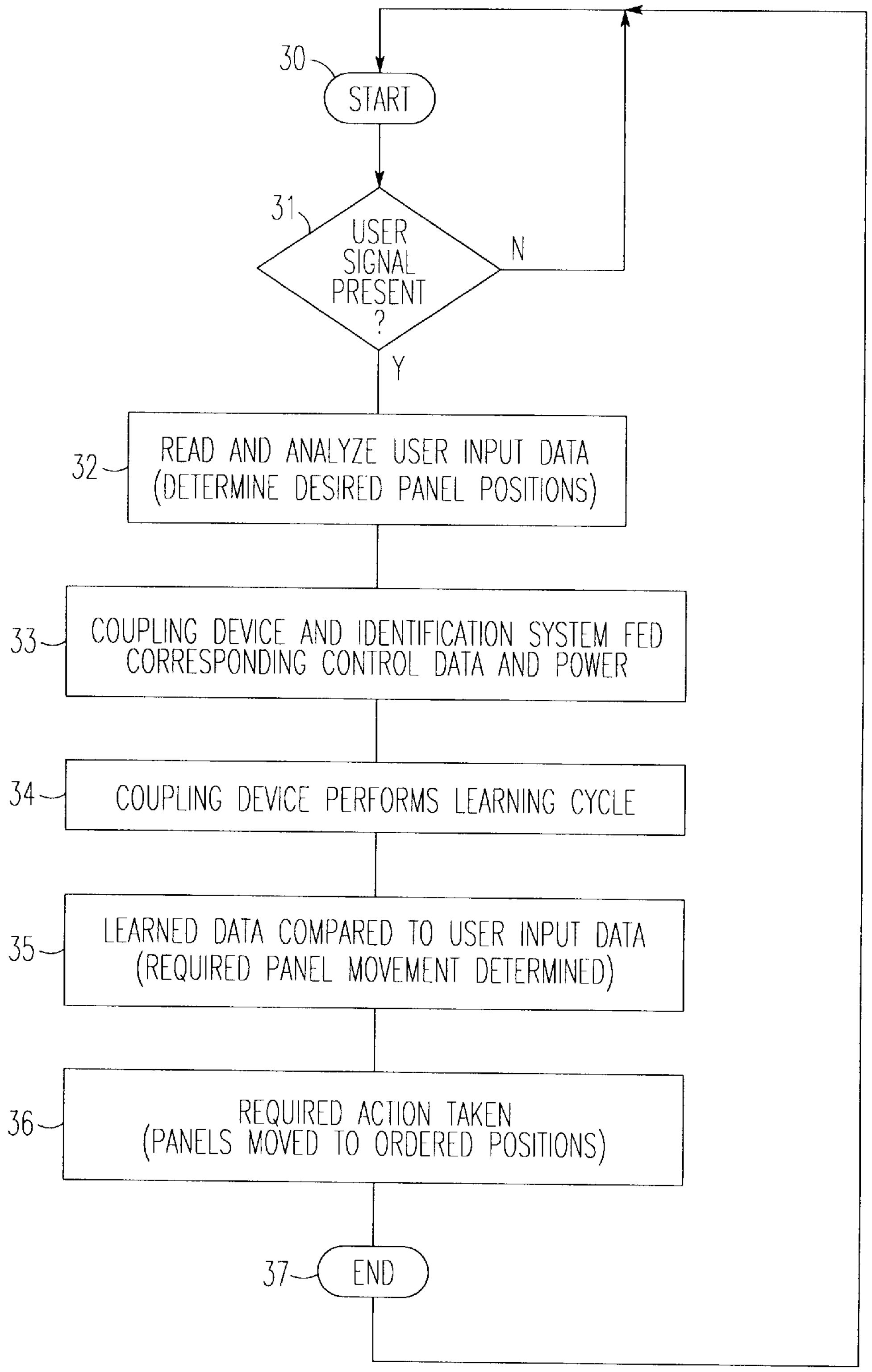
FIG. 5 is a flow chart illustrating an example of the logic that may be employed by the control system.
Figure 6:
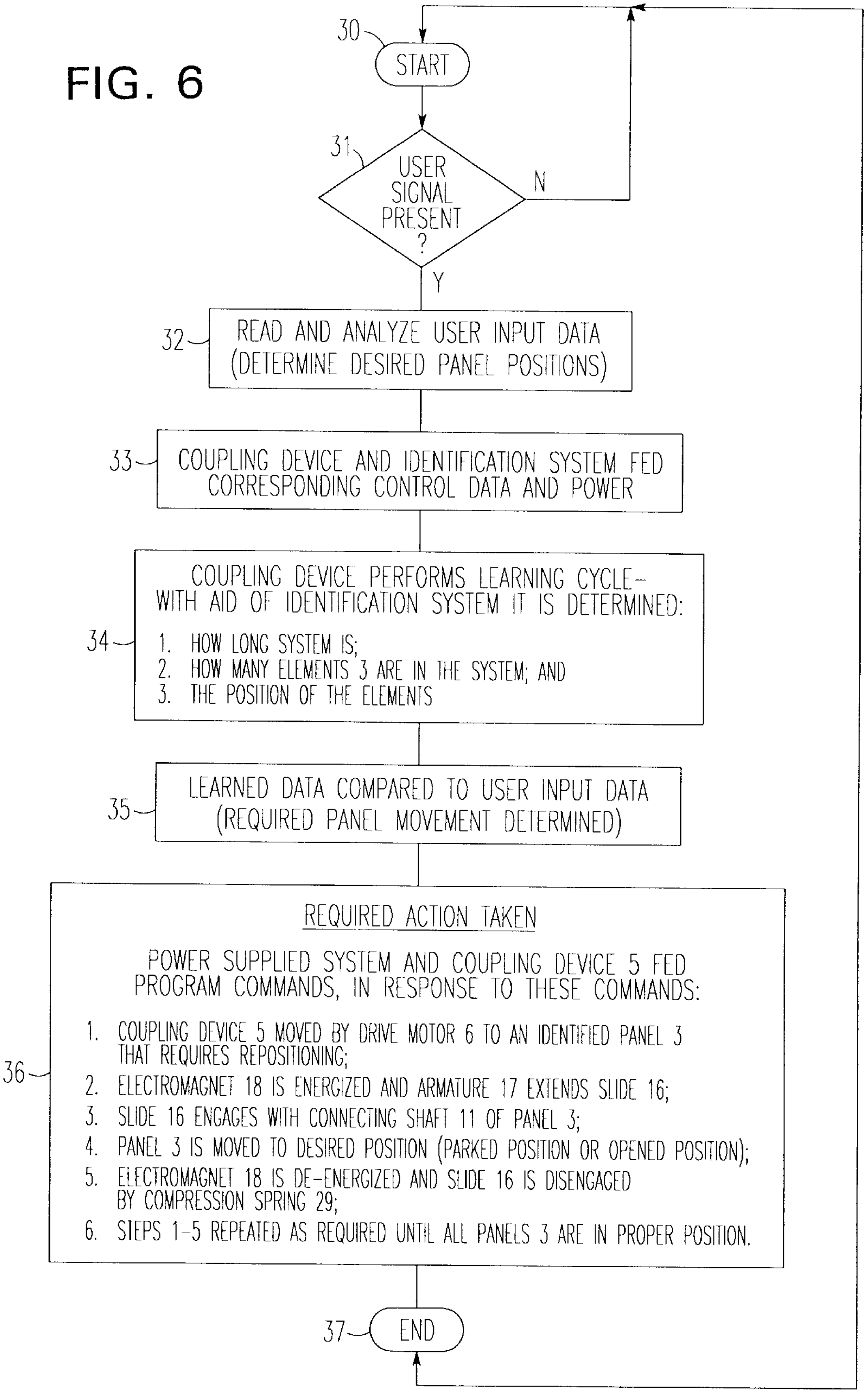
FIG. 6 is same flow chart as FIG. 5 with additional details.

FIGS. 5 and 6 are flow charts illustrating the logic that may be employed by an automatically programmed control system 101 in accordance with at least one embodiment of the instant invention. Upon start up (at 30) of the control system 101 (shown in FIG. 1B), the control system 101 determines whether a User Signal is present (at 31), that is, for example, whether User Input Data has been entered. User Input data can include, for example, codes or directions indicating the user's desired positioning of the elements 3. If User Input Data has been entered, the control system analyzes this data (at 32) and then sends the necessary control data and power to the coupling device 5 and identification system 21 (at 33) which is attached to the coupling device 5. The coupling device 5 then performs the above described learning cycle (at 34), including the location of the identified panels. This can be accomplished by use of the identification system 21 which interacts with the indicators 22 which are located on the individual panels 3. The control system 101 can then compare the "learned data" with the User Input Data, and determine what action is required by the system (at 35). The required action is then taken (at 36), that is, the coupling device 5 is fed the program commands necessary for it to move the appropriate panels into the user desired positions. This is preferably accomplished by means of the program controlled electromagnet 18 which, when energized, extends slide 16 so as to engage it with a panel 3. Once engaged with the coupling device 5, the coupling device 5 can then move the panel 3 to the desired location. Once the panel 3 is properly located, the electromagnet 18 is de-energized in response to a command from the control system 101, and thereby releases the panel 3.

To further explain, as described above, by means of a control system 101 which can be automatically programmed, or self-programmed, the coupling device 5 can be controlled so that it detects the individual elements 3 and moves them into the parked position 2. The individual elements 3 are each equipped with two trucks 24, so that they can move inside the guide rail 1. Support rollers 14 thereby support the weight of the element 3, and in the upper position of the truck 24 there are guide rollers 13 which essentially guarantee a smooth travel in the guide rail 1. Connected with the truck 24 is a connecting shaft 11 which creates the connection with the element 3 suspended below the truck 24. This connecting shaft 11 is preferably made from a round bar. To essentially guarantee a secure movement of the trucks 24 in the vicinity of the switch lever 9, those of the trucks 24 which are the first to approach the switch 9 are different, in terms of their dimensions, from the subsequent trucks. This measure is necessary because at this point, the first truck 24 is threaded or introduced in a forced manner inside the area of the switch 9. The subsequent truck must thereby be prevented from entering the switch, which can be achieved, for example, by means of a guide rail 27 which is attached inside the guide rail 1.

Furthermore, on each second truck, with reference to the direction of travel into the switch 9, there is an indicator 22 which makes it possible to conduct an identification of the element 3 and thus its location. The indicator 22 can be a microswitch, a magnet which interacts with a reed contact, a proximity switch or any other sensor means capable of correctly defining individual elements and thus their location. Next to the guide rail 1, as described above, there preferably are two slide rails 20 for the coupling device 5, which make it possible to have the coupling device 5 travel past the guide rail 1 at a defined distance in front of it. The coupling device 5 is driven by the drive belts 8. The coupling device 5 consists essentially of an electromagnet, whereby a slide 16 is connected with the armature 17 of the electromagnet. The slide 16 can thereby be realized so that it is made of a flat material, for example, in which there are slots 25, so that the slide can be displaced in the horizontal direction. On one end, the slide 16 has a fork-shaped recess 28 which can be brought into engagement with the connecting shaft 11 by actuating the electromagnets 18.

Attached to the coupling device 5 is an identification system 21 which interacts with the indicators 22 which are located on the individual elements 3. When, for example, the identification system 21 encounters an element 3 with its indicator 22, and the respective element is to be displaced, the coupling device 5 remains in this position, and by means of a program command extends the slide 16, which creates a connection with the element 3 by means of an engagement of the fork-shaped recess 28 with the connecting shaft 11. The electromagnet 18 thereby remains turned on until the controller sends the message that the coupling device has moved the element 3 into the parked position 2. When the electromagnet 18 is de-energized, a compression spring 29 guarantees that the slide 16 is disengaged from the connecting shaft 11.

One feature of the invention resides broadly in the device for an automatic partition system with individual elements 3 which can be moved by a drive motor 6 by means of a drive belt 8, whereby each element 3 can be moved horizontally by means of connecting means with two trucks 24 in a guide rail 1 which is fastened to the ceiling, and the individual elements 3 can be placed in a lateral parked position, characterized by the fact that the device consists of: a controllable and switchable coupling device 5, an identification system 21 with at least one indicator 22 on each element 3, a programmable controller, and an electromechanical rotary panel drive 10 on the first element 3.

Another feature of the invention resides broadly in the device characterized by the fact that next to or in front of the guide rail 1 on the ceiling, a unit is mounted in which there is a device which is driven by the drive motor 6 by means of the drive belts 8, and contains the controllable and switchable coupling device 5.

Yet another feature of the invention resides broadly in the device characterized by the fact that the controllable and switchable coupling device 5 comprises an electromagnet 18, and attached to the armature 17 of the electromagnet 18 there is a slide 16 which has a fork-shaped recess 28, and that the identification system 21 is integrated with the coupling device 5.

Still another feature of the invention resides broadly in the device characterized by the fact that the slide 16 is moved horizontally in a guided manner.

A further feature of the invention resides broadly in the device characterized by the fact that the power supply to the coupling device 5 and the supply of power or data to the identification system 21 is realized by means of sliding-action contacts or by means of a trailing cable 19.

Another feature of the invention resides broadly in the device characterized by the fact that the device driven by the drive motor 6 can be retrofitted on an existing partition system.

Yet another feature of the invention resides broadly in the device characterized by the fact that the indicators 22 on the elements 3 are sensors.

Still another feature of the invention resides broadly in the device characterized by the fact that the indicators 22 on the elements 3 are switches.

A further feature of the invention resides broadly in the device characterized by the fact that the indicators 22 on the elements 3 are magnets and the identification system 21 on the opposite side consists of at least one reed contact.

Another feature of the invention resides broadly in the method for the automatic operation of a partition system characterized by the fact that following the activation of the system, the coupling device 5 first executes a learning cycle to determine the number of elements 3 and the length of the distances which must be travelled.

Yet another feature of the invention resides broadly in the method characterized by the fact that an element 3 is moved either into the parked position 2 or into the closed position by means of the controller.

Still another feature of the invention resides broadly in the method characterized by the fact that a partial opening of the partition system is possible.

A further feature of the invention resides broadly in the method characterized by the fact that when the opening command is given, first the rotary panel drive 10 moves the first element into the open position, and then the individual elements 3 are moved into the parked position 2.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. P 44 24 660, filed on Jul. 14, 1994, having inventor Arnold Schack, and DE-OS P 44 24 660 and DE-PS P 44 24 660 and International Application No. PCT/DE95/00717, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Examples of devices and methods for the operation and movement of wall and door panels may be found in the following documents: U.S. Pat. No. 5,295,281, entitled "A Guiding System Having a Trolley for Moving Suspended Door Panels & the Trolley" issued to KORDES on Mar. 22, 1994; U.S. Pat. No. 5,311,642, entitled "A Door Closer with a Detent for Holding a Door Open & the Detent Therefor" issued to TILLMANN et al. on May 17, 1994; U.S. Pat. No. 5,369,912, entitled "Door and Method for Operating a Door" issued to GINZEL and BERTOLDO on Dec. 6, 1994; U.S. Pat. No. 5,394,648, entitled "Panel With a Unit for Swinging & Sliding the Panel" and issued to KORDES on Mar. 7, 1995; U.S. Pat. No. 5,417,013, entitled "Overhead Door Closer With Slide Rail for Concealed Installation in Door Panels or Door Frames" issued to TILLMANN on May 23, 1995; U.S. patent application Ser. No. 08/147769 filed on Nov. 2, 1993 entitled "Movable Wall System", having inventors Herbert KORDES, which is based on Federal Republic of Germany patent application No. P 41 33 578 filed on Oct. 10, 1991, which corresponds to DE-OS 41 33 578 and DE-PS 41 33 578, and claiming Continuation-In-Part Status from International Application No. PCT/DE92/00951, filed Nov. 11, 1992; U.S. patent application Ser. No. 08/369797 filed on Jan. 6, 1995 entitled "Wall Assemblies having Glass Doors or Glass Panes or Glass Wall Sections & Connection Members for Connection of Plate Shaped Wall Elements Such as Glass Doors, Glass Panes & Glass Wall Sections; Connection Member for Connection of Plate Shaped Wall Elements", having inventor Peter EUTEBACH, which corresponds to Federal Republic of Germany patent application No. P 43 15 357, filed on May 8, 1993, which corresponds to DE-OS 43 15 357 and DE-PS 43 15 357 and International Application No. PCT/DE94/00340, filed Mar. 24, 1994 which corresponds to WO 94/27019; U.S. patent application Ser. No. 08/369784 filed on Jan. 6, 1995 entitled "Door, Such as a Glass Door, Which Door has a Fitting With a Plate; Door Fitting With Plate", having inventor Peter EUTEBACH, which corresponds to Federal Republic of Germany patent application No. P 43 15 361 filed on May 8, 1993, which corresponds to DE-OS 43 15 361 and DE-PS 43 15 361, and International Application No. PCT/DE94/00173 filed Feb. 12, 1994 which corresponds to WO 94/27009; U.S. patent application Ser. No. 08/538160 entitled "Operating Method for the Operation of a Revolving Door" filed Oct. 2, 1995, having inventor Jurgen STARK, which corresponds to Federal Republic of Germany patent application No. P 44 02 899 filed Feb. 2, 1994, which corresponds to DE-OS 44 02 899 and DE-PS 44 02 899, and International Application No. PCT/DE94/01459 filed Dec. 8, 1994; U.S. Patent application Ser. No. 08/527823 filed on Jul. 28, 1995 entitled "Sliding Door with a Drive Motor System & Control & Regulation for a Door Driven by an Electromechanical Motor", having inventor Jurgen STARK, which corresponds to Federal Republic of Germany patent application No. P 43 40 715 filed Nov. 30, 1993, which corresponds to DE-OS 43 40 715 and DE-PS 43 40 715, and International Application No. PCT/DE94/01316 filed Nov. 2, 1994 which corresponds to WO 95/5517; U.S. patent application Ser. No. 08/582848 filed on Dec. 29, 1995 entitled "Method for the Closed-Loop Control of an Automatic Door Which is Propelled by a Drive Motor", having inventors Ulrich THEILE, which corresponds to Federal Republic of Germany patent application No. P 44 15 164, filed on May 2, 1994, which corresponds to DE-OS 44 15 164 and DE-PS 44 15 164, and International Application No. PCT/DE95/00169, filed Feb. 10, 1995 which corresponds to WO 95/30265; U.S. patent application Ser. No. 08/538156 filed on Oct. 2, 1995 entitled "Operating Method for the Operation of a Revolving Door", having inventors Jurgen STARK and Steffen STRUNK, which corresponds to Federal Republic of Germany patent application No. P 44 03 565, filed on Feb. 7, 1994, which corresponds to DE-OS 44 03 565 and DE-PS 44 03 565 and International Application No. PCT/DE94/01543, filed Dec. 24, 1994; U.S. patent application Ser. No. 08/597131 filed on Feb. 6, 1996 entitled "Door Closer for a Two-Panel Door with a Closing Sequence Control Mechanism", having inventor Horst TILLMANN, which corresponds to Federal Republic of Germany patent application No. 295 01 776, filed on Feb. 7, 1995, which corresponds to DE-OS 295 01 776 and DE-PS 295 01 776. These patents and patent applications and their corresponding published patent applications, as well as their published equivalents, and other equivalents or corresponding applications, if any, and the publications recited in any of the documents, publications, patents, and published patent applications appearing or recited herein, are hereby incorporated by reference as if set forth in their entirety herein. All of the above U.S. patent documents in this paragraph are assigned to Dorma GmbH+Co. KG of the Federal Republic of Germany.

Some examples of control systems which measure operating parameters and learn therefrom are disclosed in U.S. Pat. No. 5,191,272, entitled "Method of Adjusting Gain for Motor Control" and issued to Torii et al. on Mar. 2, 1993; U.S. Pat. No. 5,223,820, entitled "Adaptive Lamp Monitor with Single Piece Sensor" and issued to Sutterlin et al. on Jun. 29, 1993; and U.S. Pat. No. 4,655,188, issued to Tomisawa et al. on Apr. 7, 1987, which U.S. patents are hereby expressly incorporated by reference herein.

Some examples of computer systems and methods and their components which may be incorporated in an embodiment of the present invention are to be found in U.S. Pat. No. 5,379,428, entitled "Hardware Process Scheduler and Processor Interrupeter for Parallel Processing Computer Systems" and issued to Belo on Jan. 3, 1995; U.S. Pat. No. 5,398,333, entitled "Personal Computer Employing Reset Button to Enter ROM-based Diagnostics" and issued to Shieve and Finch on Mar. 14, 1995; U.S. Pat. No. 5,390,301, entitled "Method and Apparatus for Communicating Device-Specific Information Between a Device Driver and an Operating System in a Computer System" and issued to Scherf on Feb. 14, 2995; U.S. Pat. No. 5,404,544, entitled "System for Periodically Transmitting Signal to/from Sleeping Node Identifying its Existence to a Network and Awakening the Sleeping Node Responding to Received Instruction" and issued to Crayford on Apr. 4, 1995; U.S. Pat. No. 5,418,942, entitled "System and Method for Storing and Managing Information" and issued to Krawchuk on May 23, 1995; U.S. Pat. No. 5,479,355, entitled "System and Method for a Closed Loop Operation of Schematic Designs with Electrical Hardware" and issued to Hyduke on Dec. 26, 1995; and U.S. Pat. No. 5,428,790, entitled "Computer Power Management System" and issued to Harper, et al. on Jun. 27, 1995.

Some examples of rail switches or levers, or components thereof, which may be incorporated in an embodiment of the present invention are to be found in U.S. Pat. No. 5,392,895, entitled "Transfer Unit" and issued to Sorensen on Feb. 28, 1995; U.S. Pat. No. 5,404,992, entitled "Suspension Conveyor System" and issued to Robu and Enderlein on April 11, 1995; U.S. Pat. No. 5,438,911, entitled "Control Cylinder for Pneumatic Control Devices with Signal Switches" and issued to Fiedler and Supanz on Aug. 8, 1995; U.S. Pat. No. 5,440,289, entitled "Combined Alarm System and Window Covering Assembly" and issued to Riordan on Aug. 8, 1995; and U.S. Pat. No. 5,462,245, entitled "Apparatus for Locking Moveable Switch Parts" and issued to Durchschlag on Oct. 31, 1995.

Some examples of sensor and switches which may be incorporated in an embodiment of the present invention are to be found in U.S. Pat. No. 5,379,023, entitled "Alarm System" and issued to Dalton on Jan. 3, 1995; U.S. Pat. No. 5,453,589, entitiled "Microswitch with Non-enlarging, Sealed Electrical Connections" and issued to Mayer on Sep. 26, 1995; U.S. Pat. No. 5,453,590, entitled "Bistable Microswitch" and issued to Mayer on Sep. 26, 1995; U.S. Pat. No. 5,378,865, entitled "Multi-directional Shock Sensor" and issued to Reneau on Jan. 3, 1995; U.S. Pat. No. 5,408,132, entitled "Proximity Switch Operating in a Non-Contacting Manner" and issued to Fericean, et al. on Apr. 18, 1995; U.S. Pat. No. 5,428,253, entitled "Proximity Switch" and issued to Ogata and Onji on Jun. 27, 1995; 5,442,150, entitled "Piezo Electric Switch" and issued to Ipcinski on Aug. 15, 1995; U.S. Pat. No. 5,430,421, entitled "Reed Contactor and Process of Fabricating Suspended Tridemensional Metallic Microstructure" and issued to Bornand and Simon on Jul. 4, 1994; and U.S. Pat. No. 5,444,295, entitled "Linear Dual Switch Module" and issued to Lake et al. on Aug. 22, 1995.

Some examples of electromagnets and their components which may be incorporated in an embodiment of the present invention are to be found in U.S. Pat. No. 5,389,905, entitled "Damper, Electromagnet Assembly Employing the Damper, and Relay Employing the Electromagnet Assemblies" and issued to Shibata et. on Feb. 14, 1995; U.S. Pat. No. 5,392,015, entitled "Electromagnetic Relay" and issued to Matsuoka on Feb. 21, 1995; U.S. Pat. No. 5,402,093, entitled "Electromagnet Having an Armature with an Injection-molded Guide or Control Rod" and issued to Gibas and Paul on Mar. 28, 1995; and U.S. Pat. No. 5,410,289, entitled "Electromagnet" and issued to Futa on Apr. 25, 1995. incorporated in an embodiment of the present invention are to be found in U.S. Pat. No. 5,210,473, entitled "System with delay timer for motor load equalization" and issued to Backstrand on May 11, 1993; U.S. Pat. No. 5,320,186, entitled "Draft Control System with Closed Loop Drop/Raise Rate Control" and issued to Strosser et al. on Jun. 14, 1994; and U.S. Pat. No. 5,369,342, entitled "Predictive Electric Motor Positioning Device, Calibration System Therefor" and issued to Rudzewicz et al. on Nov. 29, 1994, which U.S. patents are hereby incorporated by reference herein.

Some examples of closed-loop control circuits which may be incorporated in an embodiment of the present invention are to be found in U.S. Pat. No. 5,189,605, entitled "Control and Hydraulic System for a Liftcrane" and issued to Zuehlke et al. on Feb. 23, 1993; U.S. Pat. No. 5,223,072, entitled "Intelligent Servo-Controlled Fiber Placement Machine Tensioner" and issued to Brockman et al. on Jun. 29, 1993; and U.S. Pat. No. 5,252,901, entitled "System for Controlling Locomotion of Legged Walking Robot" and issued to Ozawa et al. on Oct. 12, 1993, which U.S. patents are hereby incorporated by reference herein.

Some examples of look up tables accessed by computers or microprocessors which may be incorporated in an embodiment of the present invention are to be found in U.S. Pat. No. 5,284,116, entitled "Vehicle Management Computer" and issued to Richeson, Jr. on Feb. 8, 1994; U.S. Pat. No. 5,359,325, entitled "Automatic Monitoring System for Airfield Lighting Systems" and issued to Ford et al. on Oct. 25, 1994; and U.S. Pat. No. 5,371,537, entitled "Method and Apparatus for Automatically Calibrating a CRT Display" and issued to Bohan et al. on Dec. 6, 1994, which U.S. patents are hereby incorporated by reference herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

Foreign and international patent publication applications, namely, Federal Republic of Germany Patent Application No. P 44 03 565.9, filed on Feb. 7, 1994, and International Patent Application No. PCT/DE94/01543, filed on Dec. 24, 1994, having inventors Jürgen Stark and Steffen Strunk, and DE-OS P 44 03 565.9 and DE-PS P 44 03 565.9 and International Application No. PCT/DE94/01543, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

Partial Nomenclature

1 Guide rail
2 Parked position
3 Element
4 Rotating panel
5 Coupling device
6 Drive motor
7 Pulley
8 Drive belt
9 Switch
10 Rotary panel drive
11 Connecting shaft
12 Fastening
13 Guide rollers
14 Support roller
16 Slide
17 Armature
18 Electromagnet
19 Trailing cable
20 Slide or roller rails
21 Identification system
22 Indicator
24 Truck
25 Slots
26 Actuator arm
27 Guide
28 Fork-shaped recess
29 Spring
100 Wall Partion System
101 Control System

What is claimed is:

1. A movable wall system, said wall system comprising:

at least one suspended panel;

at least one truck;

guide rail means disposed above a floor;

said at least one truck being movable within said guide rail means;

said at least one panel comprising connecting structure connecting said at least one panel to its corresponding at least one truck;

drive apparatus to move said at least one panel;

said drive apparatus comprising apparatus for selectively coupling said at least one panel with said drive apparatus to move said at least one panel;

said apparatus for selectively coupling comprising:

a movable coupling device;

apparatus to activate said coupling device to permit the operative engagement of said coupling device with said at least one panel;

apparatus to transport, after said engagement, said at least one panel from a first position to a second position along said guide rail means; and apparatus to deactivate said coupling device to permit disengagement of said coupling device from said at least one panel.

2. The wall system according to claim 1, wherein:

said at least one panel comprises at least one indicator to indicate the identity of said at least one panel; and said coupling apparatus comprises a reader element configured to interact with and read said at least one indicator.

3. The wall system according to claim 2, comprising:

a unit for controlling said drive apparatus;

said first position comprising a storage position;

said second position comprising a closed position; and said storage position and said closed position being substantially orthogonal to one another.

4. The wall system according to claim 3, comprising:

an additional suspended panel;

a drive mechanism for moving and rotating said additional panel; and wherein said at least one truck comprises two trucks on each said at least one panel.

5. The wall system according to claim 4, wherein said apparatus to transport comprises:

a drive motor;

a drive belt driven by said drive motor;

a unit for moving said coupling device;

said drive belt being connected to said unit;

said unit being mounted substantially adjacent said guide rail means; and said coupling device being connected to said unit.

6. The wall system according to claim 5, wherein said coupling device comprises:

an actuator;

a slide portion configured to receive said connecting structure;

said reader element; and said slide portion being movable horizontally.

7. The wall system according to claim 6, comprising:

an arrangement to supply power to said coupling device and said reader element; and said unit connected to said drive belt is configured to be retrofitted on an existing wall system.

8. Device for a partition system with individual panels which can be moved by a drive motor utilizing a drive belt, wherein each panel can be moved horizontally by means of connecting apparatus with two trucks in a guide rail which is fastened to a ceiling, and the individual panels can be placed in a lateral parked position, said device comprising:

a coupling device to engage and disengage with the individual panels;

an identification system to identify the individual panels;

said identification system comprising at least one indicator disposed on each panel;

a control unit to regulate the operation of said device;

a panel drive connected to a first panel to move a first panel;

a unit;

said unit being mounted adjacent the guide rail;

said unit comprising apparatus which is driven by the drive motor by means of the drive belt; and said unit comprising said coupling device.

9. The device according to claim 8, wherein:

said coupling device comprises:

an actuator;

a slide;

said slide is attached to said actuator; and said slide comprises a fork-shaped recess;

said identification system is integrated with said coupling device; and said coupling device is controllable and switchable.

10. The device according to claim 9, wherein:

said slide is configured to move horizontally in a guided manner;

said control unit is programable; and said panel drive is an electromechanical rotary panel drive.

11. The device according to claim 10, comprising:

apparatus to supply power to said coupling device;

apparatus to supply power and data to said identification system; and said apparatus driven by the drive motor can be retrofitted on an existing partition system.

12. Method for the operation of a movable wall system, said wall system comprising: at least one suspended panel; at least one truck; guide rail means disposed above a floor; said at least one truck being movable within said guide rail means; said at least one panel comprising connecting structure connecting said at least one panel to its corresponding at least one truck; drive means for moving said at least one panel; said drive means comprising apparatus for selectively coupling said at least one panel with said drive means to move said at least one panel; said apparatus for selectively coupling comprising: a movable coupling device; means for activating said coupling device to permit the operative engagement of said coupling device with said at least one panel; means for transporting, after said engagement, said at least one panel from a first position to a second position along said guide means; and means for deactivating said coupling device to permit disengagement of said coupling device from said at least one panel; said method including the steps of:

activating the system;

executing a cycle utilizing the coupling device; and said step of executing a cycle comprising:

determining the number of panels and the length of the distance each panel must travel.

13. The method according to claim 12, wherein said wall system comprises a control unit, said method including the step of controlling the positioning of said panels into either the parked position or into a closed position by the control unit.

14. The method according to claim 13, including the step of moving only a portion of the panels into the parked position.

15. The method according to claim 14, wherein said wall system comprises an additional panel, and a drive mechanism for moving and rotating the additional panel, said method including the steps of:

activating the drive mechanism;

moving with the drive mechanism the additional panel into an open position; and moving the remaining panels into the parked position.

* * * * *